(12) United States Patent
Hristov et al.

(10) Patent No.: US 9,356,960 B2
(45) Date of Patent: May 31, 2016

(54) SECURING RADIO-FREQUENCY IDENTIFICATION SYSTEMS

(75) Inventors: Luben Hristov Hristov, Sofia (BG); Thomas Wenzel, Heilbronn (DE)

(73) Assignee: Atmel Corporation, San Jose, CA (US)

( * ) Notice: Subject to any disclaimer, the term of this patent is extended or adjusted under 35 U.S.C. 154(b) by 924 days.

(21) Appl. No.: 13/290,959

(22) Filed: Nov. 7, 2011

(65) Prior Publication Data

US 2013/0113605 A1 May 9, 2013

(51) Int. Cl.
*H04Q 5/22* (2006.01)
*H04L 29/06* (2006.01)
*H04W 12/06* (2009.01)

(52) U.S. Cl.
CPC .............. *H04L 63/18* (2013.01); *H04W 12/06* (2013.01); *Y02B 60/50* (2013.01)

(58) Field of Classification Search
CPC ............ G06K 7/0008; G06K 19/0723; G06K 19/07749; G06K 2017/0045; G07C 9/00111; H04L 63/18; H04W 12/06
USPC ........ 340/1.1, 3.51, 4.5, 4.51, 4.6, 4.61, 4.62, 340/5.61, 5.62, 5.63, 7.21, 7.22, 7.23, 505, 340/572.1–572.9, 870.28, 870.32, 426.13, 340/426.18, 426.23, 426.28, 426.29; 235/375–385; 342/42–51; 455/41.1, 455/106

See application file for complete search history.

(56) References Cited

U.S. PATENT DOCUMENTS

| | | | |
|---|---|---|---|
| 2001/0033222 A1* | 10/2001 | Nowottnick et al. | ........ 340/5.61 |
| 2003/0025588 A1* | 2/2003 | Meier et al. | .................... 340/5.2 |
| 2003/0083791 A1* | 5/2003 | Szklar et al. | ...................... 701/2 |
| 2005/0068712 A1* | 3/2005 | Schulz et al. | ................. 361/287 |
| 2009/0219134 A1* | 9/2009 | Nakasato et al. | ............ 340/5.72 |

* cited by examiner

*Primary Examiner* — Hai Phan
*Assistant Examiner* — Sisay Yacob
(74) *Attorney, Agent, or Firm* — Fish & Richardson P.C.

(57) ABSTRACT

In one embodiment, a method includes, by a base station, communicating a challenge to a transponder through a first communication link; and establishing a second communication link with the transponder. The second communication link is a capacitive link. The method also includes receiving a first response to the challenge through the first communication link with the transponder; sampling the second communication link to detect a signal corresponding to a second response to the challenge from the transponder; receiving the second response through the second communication link; and authorizing the transponder based on the first and second responses.

17 Claims, 4 Drawing Sheets

SECURING RADIO-FREQUENCY IDENTIFICATION SYSTEMS

TECHNICAL FIELD

This disclosure generally relates to wireless data communication systems.

BACKGROUND

Contactless identification systems or radio-frequency identification (RFID) systems may include a base station and one or more transponders or remote sensors. In an active transponder system the base station and transponder each have their own power supply. Moreover, in the active transponder system, the transponder may have an active transponder for data transmission to the base station. In a passive transponder system, the transponders do not have their own power supply or an active transmitter for data transmission to the base station. Passive transponders may draw power necessary for their operation from an electromagnetic field emitted by the base station.

In a RFID system, data may be wirelessly exchanged between the base station and associated transponders. The data exchange between the transponder and base station may be in response to a signal from the base station after an authentication procedure. In certain cases, the authentication procedure may be initiated without prompting from a user through re-transmission of signals between the transponder and base station. Data exchanged between the transponder and base station may include information to identify the transponder to the base station or initiate a function of a device.

DESCRIPTION OF EXAMPLE EMBODIMENTS

Figure 1:
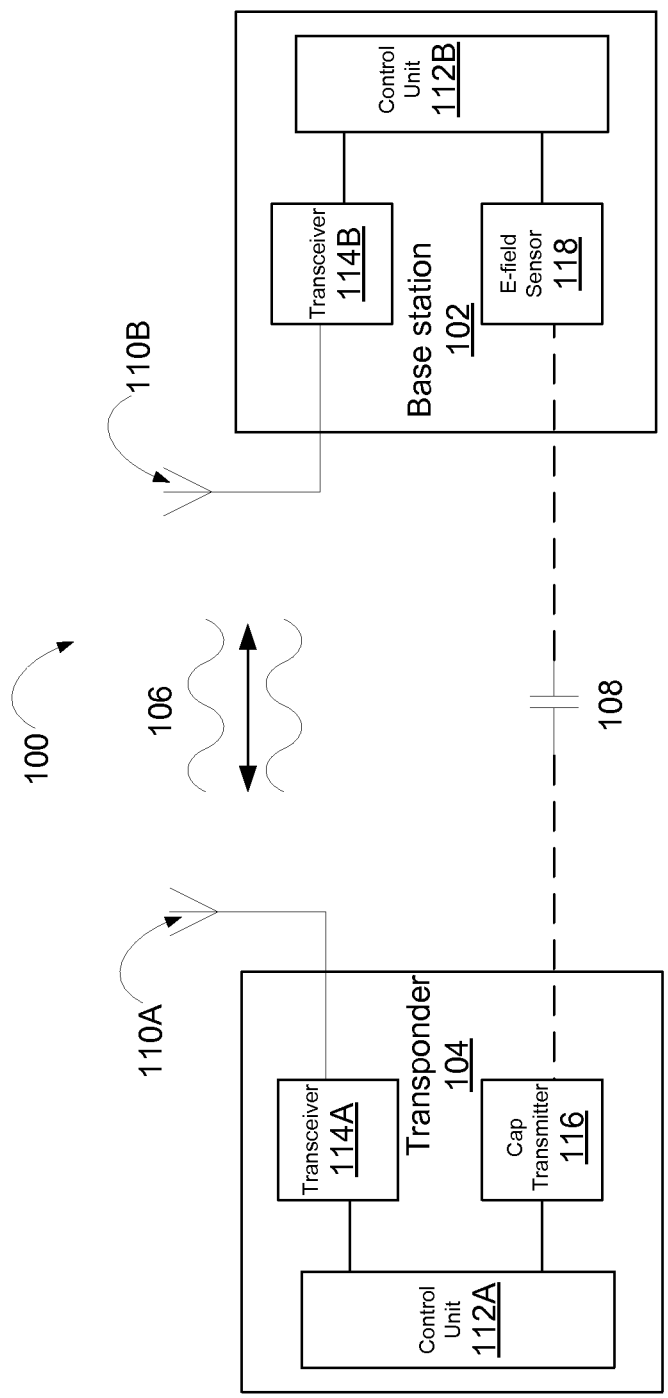
FIG. 1 illustrates an example system for wireless data exchange.

FIG. 1 illustrates an example system for wireless data exchange. In the example of FIG. 1, example system 100 includes a base station 102 in communication with a transponder 104 through one or more bidirectional communication links 106 and a capacitive link 108. As an example and not by way of limitation, communication link 106 may include a low frequency (LF) and/or radio frequency (RF) link and may operate in either a full-duplex or half-duplex mode. As another example, capacitive link 108 may operate as either a unidirectional or bidirectional link. Although this disclosure describes or illustrates particular communication links 106, this disclosure contemplates any suitable communication link such as for example near field communication (NFC), Bluetooth, capacitive, wireless local area network (WLAN), ZigBee, other suitable communication protocols, or suitable combination of these. Transponder 104 may include an antenna 110A, a control unit 112A, a transmitting/receiving device (transceiver) 114A, and a capacitive transmitter 116. Base station 104 may include an antenna 110B, a control unit 112B, a transceiver 114B, and an electric field sensor 118. Although this disclosure describes and illustrates a particular arrangement of particular components for transponder 104 and base station 102, this disclosure contemplates any suitable arrangement of any suitable components for transponder 104 and base station 102.

Transceiver 114B coupled to antenna 110B of base station 102 may be configured to communicate data to transponder 104 through communication link 106. Similarly, transceiver 114A coupled to antenna 110A of transponder 104 may be configured to communicate data through communication link 106 to base station 102. Capacitive transmitter 116 of transponder 104 may be configured to communicate data to electric field sensor 118 of base station 102 through capacitive link 108. As an example and not by way of limitation, capacitive link 108 may be a relatively short range, low-speed communication link. Control unit 112A may be coupled to transceiver 114A and capacitive transmitter 116 of transponder 104. Similarly, control unit 112B may be coupled to transceiver 114B and electric field sensor 118 of base station 102. In particular embodiments, electric field sensor 118 may be a capacitive sensor and base station 104 may further include a sense electrode (not shown) coupled to electric field sensor 118 to receive data communicated by transponder 104 through capacitive link 108. Data communication through communication link 106 and capacitive link 108 may be controlled by control units 112A and 112B of transponder 104 and base station 102, respectively. Control units 112A and 112B may be one or more integrated circuits (ICs)—such as for example general-purpose microprocessors, microcontrollers, programmable logic devices (PLDs) or arrays (PLAs), application-specific ICs (ASICs).

Figure 2:
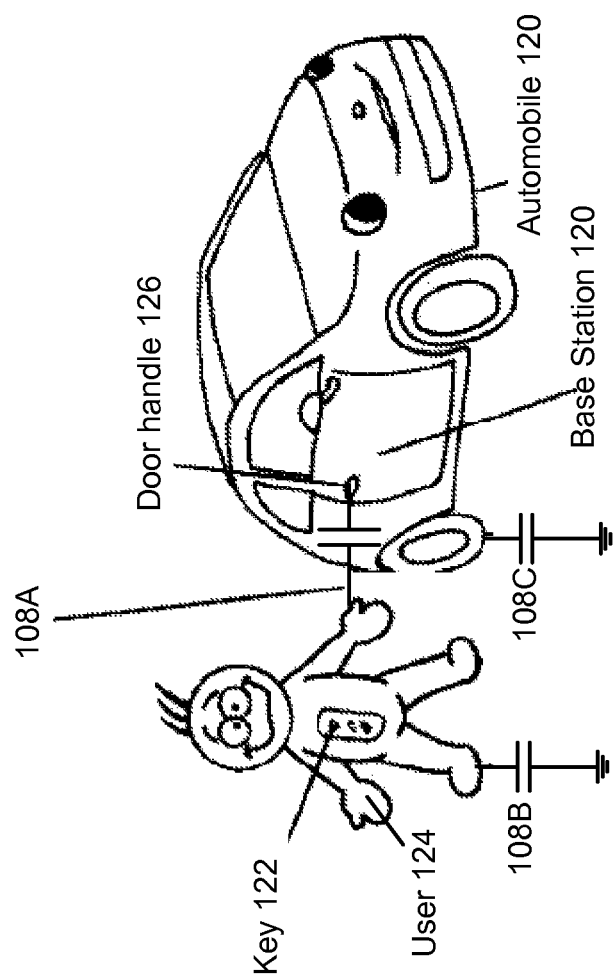
FIG. 2 illustrates an example use of the example system of FIG. 1.

FIG. 2 illustrates an example use of the example system of FIG. 1. In the example of FIG. 2, base station 102 may be contained within an automobile 120 and the transponder may be located within a key 122 associated with automobile 120 carried by a user 124. In particular embodiments, the transponder may be located separately from key 122. As an example and not by way of limitation, electric field sensor of base station 102 may be a capacitive sensor coupled to a sense electrode located in a door handle 126 of automobile 120. As another example, door handle 126 and a sense electrode of the electric field sensor may be separate components and the sense electrode may be placed inside door handle 126.

Capacitive link may have a component 108A due to close proximity of user 124 to door handle 126 and another component (not shown) between user 124 and key 122. As an example and not by way of limitation, component 108A of capacitive link may be established through contact between user 124 and door handle 126. A return path 108B-C may be associated with capacitive link 108A. As an example and not by way of limitation, the return path 108B-C may include component 108B due to coupling between user 124 and ground and component 108C due to coupling between automobile 126 and ground. Data communicated from the transponder to base station 102 may be attenuated through the capacitive link 108A and the associated return path 108B-C. As an example and not by way of limitation, the highest attenuation of data may occur in the return path 108B-C, followed by data attenuation in the link between key 122 and user 124. The least amount of data attenuation in capacitive link 108A may occur through capacitive component 108A between user 124 and door handle 126. Although this disclosure describes and illustrates a particular placement of the transponder and components of base station 102 within a particular apparatus, this disclosure contemplates any suitable placement of the transponder and components of base station 102 as part of any suitable apparatus.

In particular embodiments, base station 102 in automobile 120 may communicate a wake-up key through communication link 106, e.g. RF or LF transmission, to activate the transponder in key 122. In response to receiving the wake-up key from base station 102, the transponder may subsequently communicate an identification confirmation to base station 102 through communication link 106. The control unit of base station 102 may calculate a challenge through any suitable crypto-algorithm and the transceiver may communicate the challenge to the transponder through communication link 106 in response to receiving the identification confirmation of the transponder. The transponder may receive the challenge from base station through communication link 106. The control unit of the transponder may decode the challenge from base station 102 and calculate a subsequent response through the crypto-algorithm shared with base station 102. In particular embodiments, the subsequence response may have two or more components. A first component may be a primary response communicated through communication link 106. A second component may be an additional authentication code communicated to base station 102 through capacitive link 108A. As an example and not by way of limitation, communication of the additional authentication code through capacitive link 108A may prevent authorization based on attacks to communication link 106.

The additional authentication code may be communicated from the capacitive transmitter of the transponder to base station 102 through capacitive link 108A formed from user 124 establishing physical contact with or being in close proximity to door handle 126 of automobile 120. The control unit of base station 102 may detect the additional authentication code received at the capacitive sensor through the sense electrode in door handle 126. As described above, communication of the additional authentication code may be attenuated due in part to the return path between user 124 and ground 108B and between automobile 120 and ground 108C. Data received by the capacitive sensor may be processed by the control unit of base station 102. Sensitivity of a detection algorithm of the control unit of base station 102 may be increased by increasing the time allocated for capacitive signal detection, i.e. increase the signal integration time, over allocating time for receiving a large number of serial data bits. In particular embodiments, the additional authentication code may contain a substantially smaller number of data bits than contained in the primary response depending on a speed of capacitive link 108A.

Figure 3:
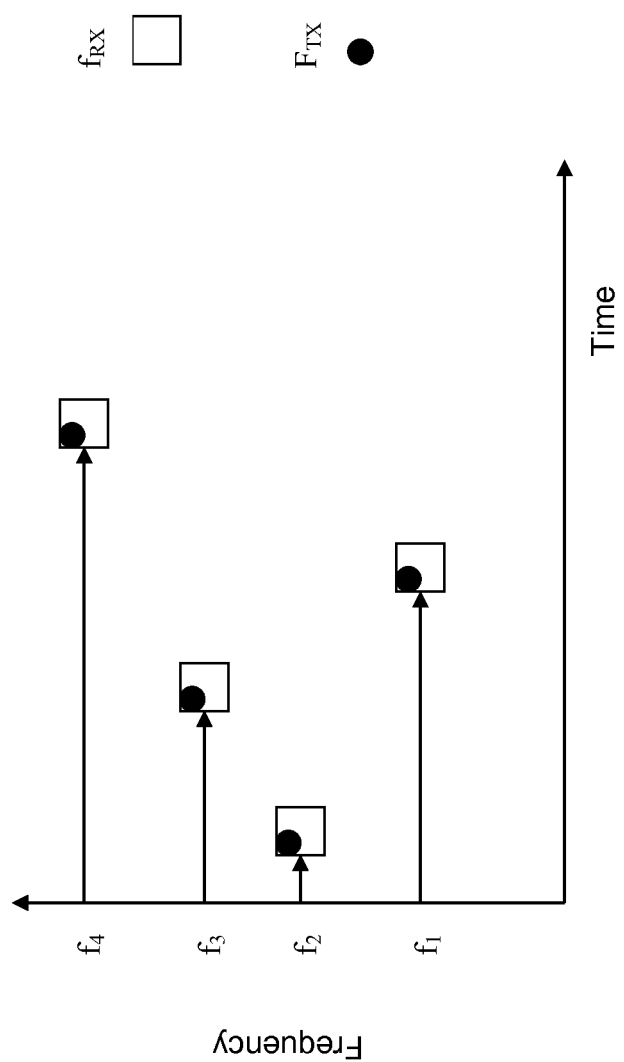
FIG. 3 illustrates an example frequency hopping scheme.

FIG. 3 illustrates an example frequency hopping scheme. In particular embodiments, the transponder may be configured to encode the additional authentication code at one or more frequencies within the range covered by the capacitive measurement algorithm of the control unit of the base station. The capacitive sensor of the base station may be sampled by the control unit at a predetermined frequency and the additional authentication code communicated through an external electric field coupled to the capacitance sensor at the same frequency may be detected by the detection algorithm of the control unit of the base station. As an example and not by way of limitation, a frequency hopping scheme may be applied by the transponder to encode the additional authentication code using one or more frequency channels. In the example of FIG. 3, the capacitive transmitter of the transponder communicates data bits to the base station through four frequency channels. Over the period of time shown in FIG. 3, data bits may be communicated in an example order corresponding to frequency channels $f_2$, $f_3$, $f_1$, and $f_4$. Although this disclosure describes and illustrates a particular number of frequency channels comprising the capacitive link, this disclosure contemplates any suitable number of frequency channels supported by the capacitive link. Using the example frequency encoding scheme, values of the data bits may be encoded using a corresponding pair of frequencies and the frequencies used by the capacitive transmitter of the transponder to communicate the data bits of the additional authentication code may be selected according to the particular data bits to be communicated to the base station.

Conversely, on the base station side, the capacitance sensor may be sampled at particular frequencies in accordance with the encoding algorithm described above. In particular embodiments, the sequence for a subsequent frequency channel may be determined by the expected value of the subsequent data bit of the additional authentication code as described above. Since the expected data bits of the additional authentication code may be known through the crypto-algorithm used by both the transponder and base station, the base station may scan the frequencies determined by subsequent data bits. In other particular embodiments, the base station may detect the subsequent frequency channel through a phase-locked loop (PLL) coupled to the sense electrode of the base station. Although this disclosure describes and illustrates particular methods of encoding data communicated through a capacitive link, this disclosure contemplates any suitable data encoding protocol for communication over a capacitive link, such as for example phase or amplitude modulation of the capacitive signal or one or more bursts of charge transferred through the capacitive link in phase with a signal at a predetermined frequency.

Figure 4:
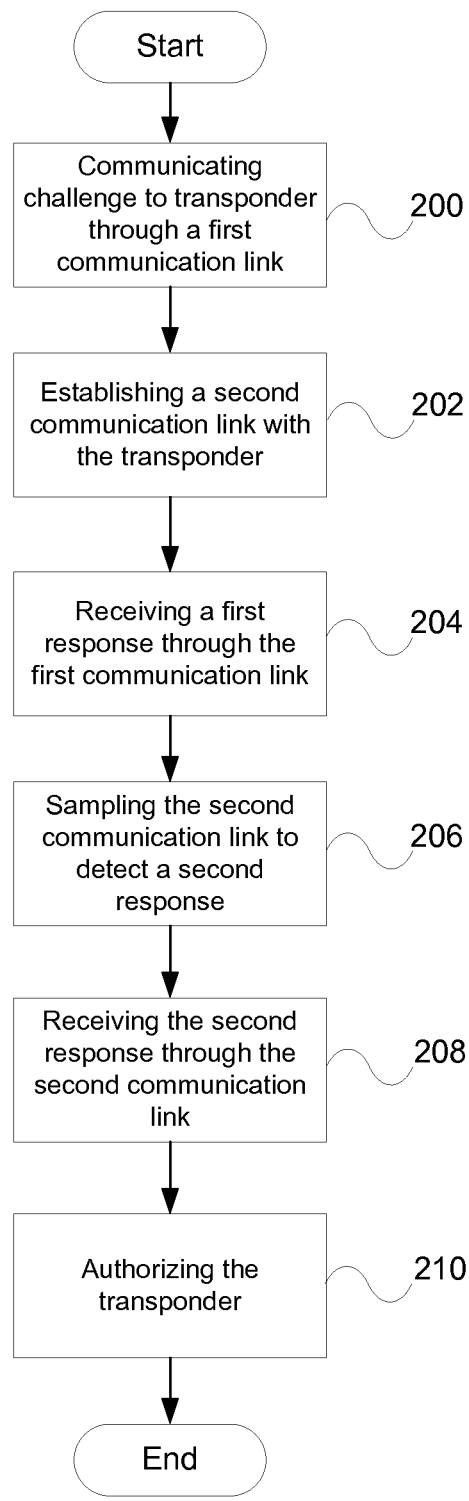
FIG. 4 illustrates an example method for authorizing a transponder.

FIG. 4 illustrates an example method for authorizing a transponder. The method may start at step 200, where a base station communicates a challenge to the transponder through a first communication link. In particular embodiments, the challenge may be transmitted through a RF or LF link between the base station and transponder. As an example and not by way of limitation, the LF link may wake up the transponder and the RF link may transfer data the challenge. Step 202 may establish a second communication link with the transponder. As described above, the second communication link may be a capacitive link established through a user contacting a sense electrode in a door handle of an automobile. At step 204, a first response to the challenge may be received through the first communication link. In particular embodiments, the response to the challenge may be calculated using a suitable crypto-algorithm. Step 206 may sample the second communication link for a signal corresponding to a second response to the challenge. As described above, the transponder may partition communication of the response to the challenge through two or more communication links. At step 208, the second response may be received through the second communication link. As described above, the second response may contain a substantially smaller number of data bits than contained in the first response. At step 210, the transponder may be authorized based on the first and second responses, at which point the method may end. In particular embodiments, after authorization, a function of a device may be initiated. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a base station, communicating a challenge to a transponder through a first communication link, the first communication link being a radio frequency communication link;
   establishing a second communication link with the transponder, the second communication link being a capacitive link;
   receiving a first response to the challenge through the first communication link with the transponder;
   sampling the second communication link to detect two or more signals corresponding to a second response to the challenge from the transponder, the second response including an authentication code, wherein the two or more signals are transmitted by the transponder with different frequencies and encode different portions of the authentication code; and
   authorizing the transponder based on the first and second responses.

2. The method of claim 1, wherein the base station is located in an automobile and the transponder is located in a key of the automobile.

3. The method of claim 2, wherein an electric field sensor of the second communication link is located in a door handle of the automobile and the capacitive link is a unidirectional communication link established by a user contacting the door handle, the contact with the door handle preventing authorization based on attacks to the first communication link.

4. The method of claim 2, further comprising initiating a function of the automobile based on the authorizing, the function of the automobile being one of releasing a door of the automobile, igniting an engine of the automobile, and locking the door of the automobile.

5. The method of claim 1, wherein the authentication code contains less bits than is contained in the first response.

6. The method of claim 1, wherein the first communication link is a low-frequency or radio-frequency communication link.

7. One or more computer-readable non-transitory storage media embodying logic configured when executed to:
   communicate a challenge to a transponder through a first communication link, the first communication link being a radio frequency (RF) communication link;
   establish a second communication link with the transponder, the second communication link being a capacitive link through a capacitance sensor of a base station;
   receive a first response to the challenge through the first communication link with the transponder;
   sample the second communication link to detect two or more signals corresponding to a second response to the challenge from the transponder, the second response including an authentication code, wherein the two or more signals are transmitted by the transponder with different frequencies and encode different portions of the authentication code; and
   authorize the transponder based on the first and second responses.

8. The media of claim 7, wherein the base station is located in an automobile and the transponder is located in a key of the automobile.

9. The media of claim 8, wherein an electric field sensor of the second communication link is located in a door handle of the automobile and the capacitive link is a unidirectional communication link established by a user contacting the door handle, the contact with the door handle preventing authorization based on attacks to the first communication link.

10. The media of claim 8, wherein the logic is further configured to initiate a function of the automobile based on the authorizing, the function of the automobile being one of releasing a door of the automobile, igniting an engine of the automobile, and locking the door of the automobile.

11. The system of claim 7, wherein the authentication code contains less bits than is contained in the first response.

12. The media of claim 7, wherein the first communication link is a low-frequency or radio-frequency communication link.

13. A system comprising:
   one or more communication interfaces including a capacitive communication interface; and
   one or more computer-readable non-transitory storage media embodying logic configured when executed to:
      communicate a challenge to a transponder through a first communication link, the first communication link being a radio frequency (RF) communication link;

establish a second communication link with the transponder, the second communication link being a capacitive link through a capacitance sensor of a base station;

receive a first response to the challenge through the first communication link with the transponder;

sample the second communication link to detect two or more signals corresponding to a second response to the challenge from the transponder, the second response including an authentication code, wherein the two or more signals are transmitted by the transponder with different frequencies and encode different portions of the authentication code; and authorize the transponder based on the first and second responses.

14. The system of claim 13, wherein the base station is located in an automobile and the transponder is located in a key of the automobile.

15. The system of claim 14, wherein an electric field sensor of the second communication link is located in a door handle of the automobile and the capacitive link is a unidirectional communication link established by a user contacting the door handle, the contact with the door handle preventing authorization based on attacks to the first communication link.

16. The system of claim 14, wherein the logic is further configured to initiate a function of the automobile based on the authorizing, the function of the automobile being one of releasing a door of the automobile, igniting an engine of the automobile, and locking the door of the automobile.

17. The system of claim 13, wherein the authentication code contains less bits than is contained in the first response.

* * * * *